(12) United States Patent
Ito et al.

(10) Patent No.: US 6,437,518 B1
(45) Date of Patent: Aug. 20, 2002

(54) LIGHTING CIRCUIT FOR AN ELECTRIC DISCHARGE LAMP

(75) Inventors: Masayasu Ito; Hitoshi Takeda, both of Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 09/759,558

(22) Filed: Jan. 12, 2001

(30) Foreign Application Priority Data

Jan. 17, 2000 (JP) ........................................ 2000-007623

(51) Int. Cl.⁷ .............................................. H05B 37/00
(52) U.S. Cl. ................... 315/290; 315/276; 315/209 R; 315/224; 315/DIG. 5; 315/DIG. 7
(58) Field of Search ............................. 315/209 R, 276, 315/291, 224, 244, 307, 127, 82, 360, DIG. 5, DIG. 7, 290, 289

(56) References Cited

U.S. PATENT DOCUMENTS 5,498,933 A * 3/1996 Nakamura .................. 315/205
5,705,898 A 1/1998 Yamashita et al. .......... 315/308
6,034,487 A * 3/2000 Yamashita et al. .......... 315/244

FOREIGN PATENT DOCUMENTS

JP 07-201475 A * 8/1995

* cited by examiner

Primary Examiner—Haissa Philogene
(74) Attorney, Agent, or Firm—Fish & Richardson P.C.

(57) ABSTRACT

A lighting circuit 1 for an electric discharge lamp. The circuit includes a DC electric power source circuit 3, DC-AC conversion circuit 4 and starting circuit 5. The starting circuit 5 includes a primary circuit of a transformer has a condenser and switch element, and the switch element is closed so that a high voltage signal for starting is impressed upon an electric discharge lamp from a primary winding via a secondary winding when voltage across both terminals of a condenser exceeds a threshold value in accordance with an accumulation of electric charges in the condenser. In the case where an output voltage of the DC electric power source circuit 3 is positive (or negative) with respect to the electric potential of ground, the polarity of supply voltage supplied from the DC electric power source circuit 3 or the DC-AC conversion circuit 4 for charging the condenser in the starting circuit 5 (the primary circuit in the starting circuit 5) is regulated to be negative (or positive).

5 Claims, 10 Drawing Sheets

LIGHTING CIRCUIT FOR AN ELECTRIC DISCHARGE LAMP

TECHNICAL FIELD OF THE INVENTION

The present invention relates to a technique for supplying voltage to a starting circuit which generates a high voltage starting signal for an electric discharge lamp, provided in a lighting circuit of an electric discharge lamp.

BACKGROUND OF THE INVENTION

Concerning a lighting circuit for lighting an electric discharge lamp (such as a metal halide lamp), a structure is well known which includes a DC electric power source circuit, DC-AC conversion circuit and starting circuit (what is called a starter circuit). For example, a DC-DC converter is used in the DC electric power source circuit, and a full bridge type circuit (four semiconductor switch elements (or switching elements) are formed into two pairs so as to conduct switching control) and its driver circuit are used in the DC-AC conversion circuit. In the above structure, the voltage of positive or negative polarity output by the DC-DC converter is converted into a rectangular wave voltage by the full bridge type circuit and supplied to an electric discharge lamp.

In this connection, concerning the starting circuit, for example, the starting circuit includes a transformer, a condenser provided on the primary winding side and a self-yielding type switch element. When the voltage across both terminals of the condenser exceeds a threshold value, the self-yielding type switch element yields to the voltage, so that a primary current flows in the circuit and the voltage of this current is boosted and impressed upon the electric discharge lamp from the secondary winding.

In this connection, it is well known that in the case of no load in which an electric discharge lamp has not been turned on yet, the higher the voltage is {what is called an open circuit voltage or open voltage, which is temporarily output by the DC electric power source circuit (DC-AC converter)), the more easily the electric discharge lamp can be turned on.

However, when the above open circuit voltage is raised too high, it becomes necessary to increase the withstanding voltages of the DC electric power source circuit and the DC-AC conversion circuit, which causes an increase in the manufacturing cost. Therefore, the upper limit of above open circuit voltage is restricted.

In the case of generating the starting voltage for starting the electric discharge lamp, if it is possible to generate a starting pulse (or starter pulse) by supplying an open circuit voltage, which is obtained from the DC electric power supply circuit or DC-AC conversion circuit, to the primary circuit of the starting circuit, the number of parts composing the circuit can be reduced to be minimum. However, in order to obtain a pulse, the wave length of which is sufficiently high for starting the electric discharge lamp, it is necessary to increase a boosting ratio of the transformer provided in the starting circuit. In order to increase the boosting ratio of the transformer, it is necessary to increase the inductance of the secondary winding of the transformer concerned. As a result, the size of the transformer is increased, which raises the manufacturing cost.

It is possible to use a structure in which the output voltages of the DC electric power source circuit and the DC-AC conversion circuit are boosted up by a voltage doubler circuit, which is newly provided, including a condenser and diode, and then the thus boosted voltage is supplied to the starting circuit. It is also possible to use a structure in which a new secondary winding is provided on the secondary side of the converter transformer composing the DC electric power source circuit, and a high voltage output is supplied from the winding concerned to the starting circuit.

However, according to the above circuit structure, it is necessary to increase a withstanding voltage of the line through which the output voltage of the voltage doubler circuit is impressed. It is also necessary to increase a withstanding voltage of the line through which the output voltage of the secondary winding is supplied to the starting circuit. Therefore, severe design constraints are imposed on the circuit so that it can withstand the high voltage.

When the voltage supplied to the starting circuit (the primary circuit of the starting circuit) is raised, safety problems may be encountered concerning the wiring. That is, when the starting circuit is arranged close to the electric discharge lamp (for example, when the lighting device is attached to the starting circuit), it is necessary to lay two electric power supply lines from the output terminals of the lighting circuit to the electric discharge lamp, and further it is necessary to lay one voltage supply line from the output terminal of the lighting circuit to the starting circuit. From the viewpoint of preventing accidental electrocution, it is preferable that the voltage of the voltage supply line is set as low as possible, that is, it is preferable that the electrical potential of the voltage supply line with respect to the ground electric potential (GND) is low.

SUMMARY OF THE INVENTION

The present invention reduces a withstanding voltage of a voltage supply line to a starting circuit of a lighting circuit to be as low as possible so as to enhance safety by reducing the difference in electric potential of the voltage supply line with respect to the ground electric potential. In addition, the present invention reduces the manufacturing cost.

Presented is a lighting circuit of an electric discharge lamp that includes a DC electric power source circuit for outputting a DC voltage; a DC-AC conversion circuit for converting an output voltage of the DC electric power source circuit into an AC voltage so as to supply the AC voltage to an electric discharge lamp; and a starting circuit for generating a high voltage starting signal to start the electric discharge lamp. The lighting circuit of an electric discharge lamp has the structure shown in the following items (a) to (d).

(a) The starting circuit includes a transformer including a magnetic body, primary winding and secondary winding, and a primary circuit provided on the primary side of the transformer.

(b) The primary circuit includes the primary winding and a series circuit of a condenser and a switch element, and the series circuit is connected in parallel with the primary winding.

(c) When or after the voltage across both terminals of the condenser exceeds a threshold value in accordance with the accumulation of electrical charge in the condenser, the switch element is electrically continued so that the high voltage starting signal is impressed upon the electrical discharge lamp from the primary winding via the secondary winding.

(d) When the output voltage of the DC electric power source circuit is positive with respect to the ground electric potential, the polarity of the supply voltage supplied to the primary circuit for charging the condenser in the primary circuit according to the output from the DC electric power source circuit or DC-AC conversion circuit is made to be a negative polarity, and when the output voltage of the DC electric power source circuit is negative with respect to the ground electric potential, the polarity of the supply voltage supplied to the primary circuit for charging the condenser in the primary circuit according to the output from the DC electric power source circuit or DC-AC conversion circuit is made to be a positive polarity.

Consequently, according to the present invention, when the supply voltage, the polarity of which is the reverse of the polarity of the output voltage of the DC electric power source circuit, is supplied to the primary circuit of the starting circuit, the withstanding voltage of the voltage supply line to the circuit concerned can be reduced.

DETAILED DESCRIPTION

Figure 1:
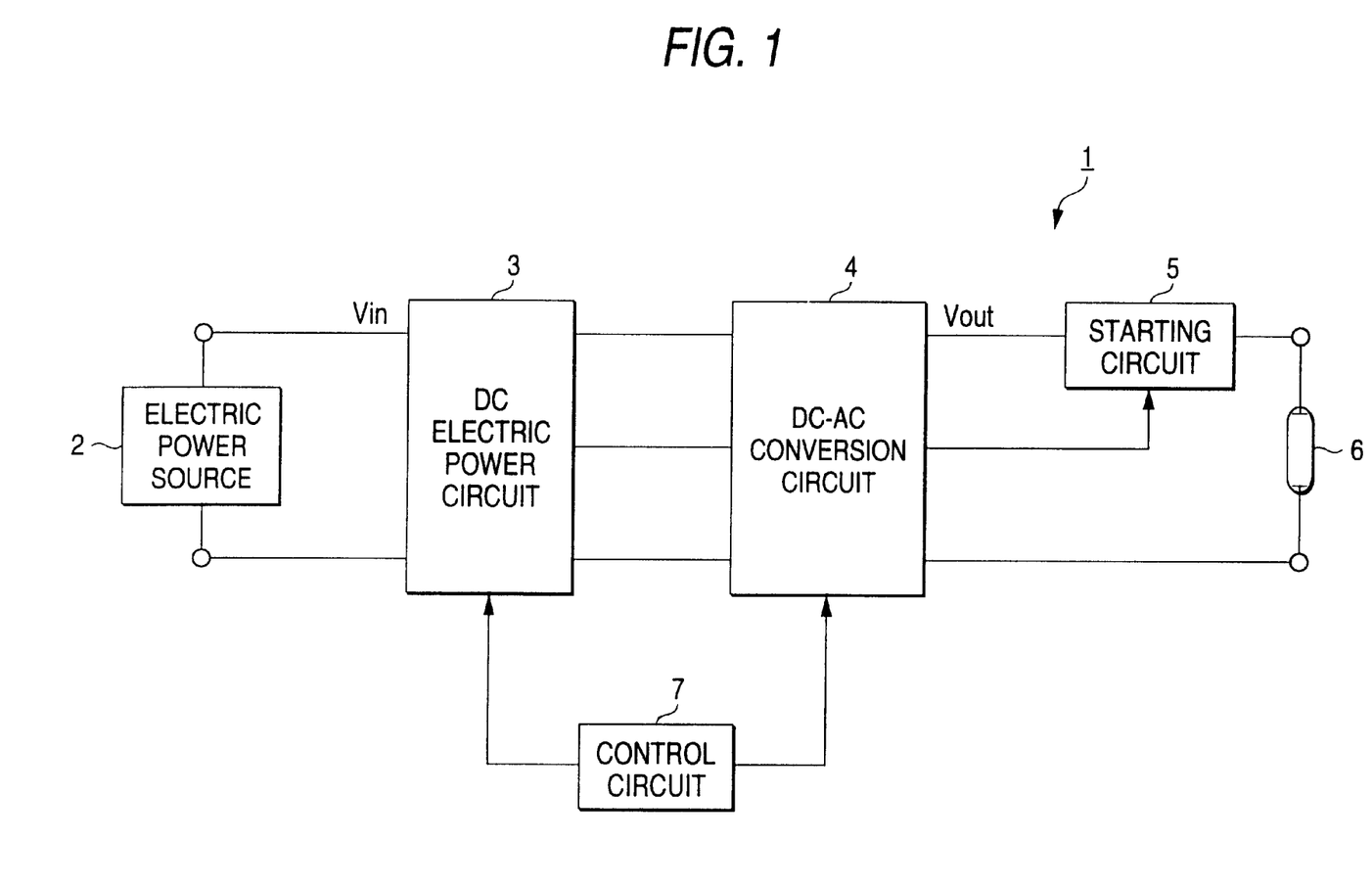
FIG. 1 is a circuit block diagram showing a basic structure of a lighting circuit of an electric discharge lamp according to the present invention.

FIG. 1 is a view showing an implementation of a lighting circuit of an electric discharge lamp of the present invention. The lighting circuit 1 of an electric discharge lamp includes: an electric power source 2, DC electric power source circuit 3, DC-AC conversion circuit 4 and starting circuit 5. The lighting circuit 1 of an electric discharge lamp controls power to turn on and off an electric discharge lamp 6 (such as a metal halide lamp).

The DC electric power source circuit 3 receives a DC input voltage (which will be referred to as "Vin" hereinafter) from the electric power source 2 and outputs a predetermined DC voltage. The output voltage of the DC electric power source circuit 3 is subjected to variable control according to a control signal sent from the control circuit 7. A DC-DC converter (such as a chopper type or fly-back type converter) having a structure of a switching regulator is used for this DC electric power source circuit 3. In general, the following forms are used.

(i) A first form having a positive polarity output (the output voltage, the electric potential of which is positive with respect to the electric potential of the ground)

(ii) A second form having a negative polarity output (the output voltage, the electric potential of which is negative with respect to the electric potential of the ground)

(iii) A third form having both polarity output types (both the output voltages, the electric potentials of which are positive and negative with respect to the electric potential of the ground)

That is, in the forms of the above items (i) and (ii), the output voltage of the DC electric power source circuit 3 is fixed to one of the polarities of the positive and the negative voltage. On the other hand, in the form of the above item (iii), both polarity type voltages (the positive and the negative) can be outputted.

Figure 2:
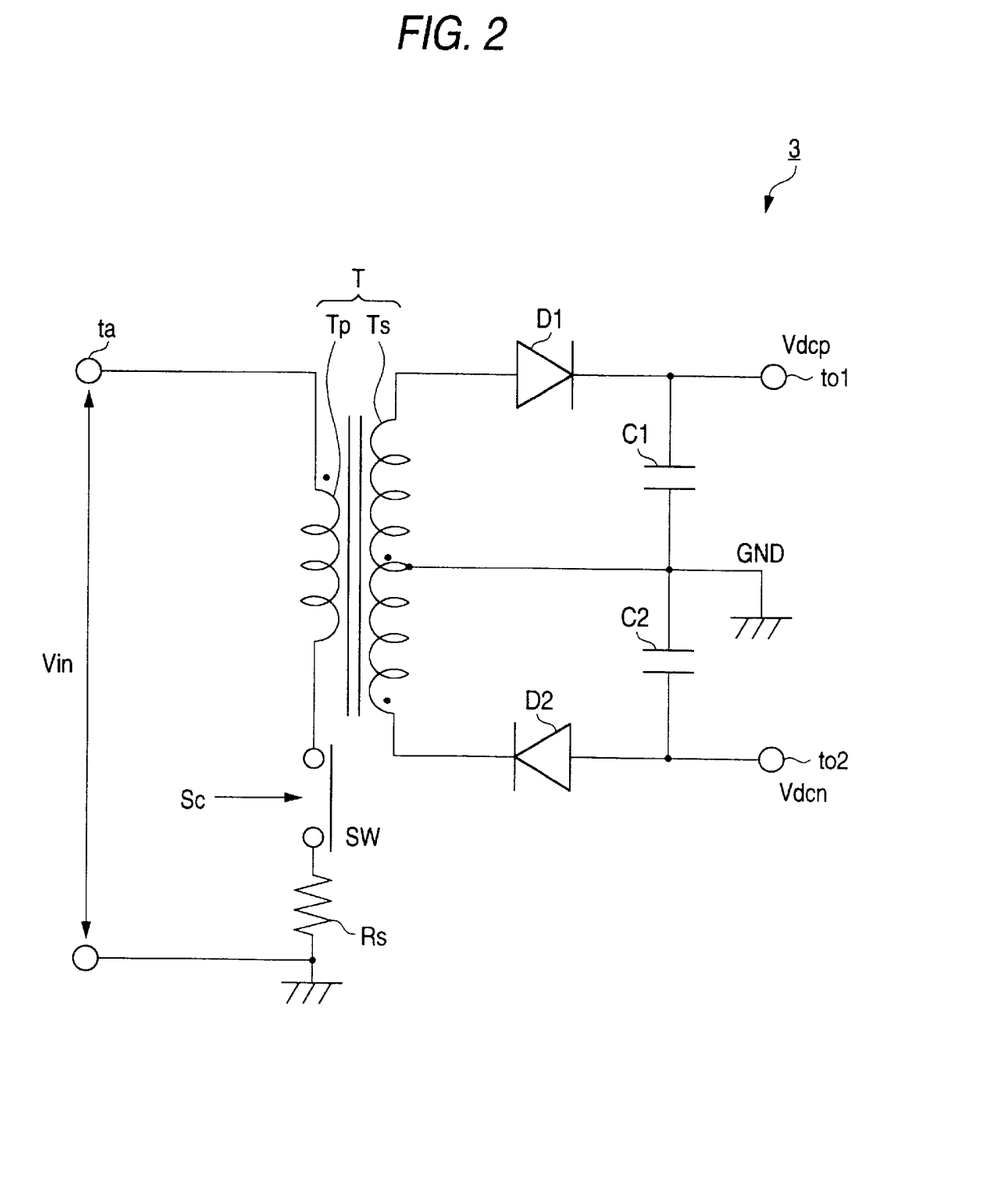
FIG. 2 is a circuit diagram showing an example of a structure of a DC electric power source circuit.

FIG. 2 is a view showing an example of the structure of the DC electric power source circuit 3 of the form described in item (iii). When one end of primary winding Tp of transformer T is connected with DC input terminal "ta", voltage Vin can be inputted into transformer T. The other end of primary winding Tp of transformer T is grounded via semiconductor switch SW and electric current detecting resistor Rs. In this case, semiconductor switch SW is shown by the mark of a switch in the drawing, however, an electric effect field transistor may be used for semiconductor switch SW. (In this case, resistor Rs is arbitrarily arranged, that is, resistor Rs may not be necessary). Control signal "Sc" is supplied from the control circuit 7 to the control terminal (gate in the case of FET) of semiconductor switch SW, so that switching control can be conducted.

One end of secondary winding Ts of transformer T is connected with the anode of diode D1, and the cathode of diode D1 is grounded via condenser C1. The terminal voltage of condenser C1 is outputted from terminal "to1" as a positive polarity output voltage ("Vdcp"). The other end of secondary winding Ts is connected with the cathode of diode D2, and the anode of diode D2 is grounded via condenser C2 and connected with terminal "to2". Therefore, the negative polarity output voltage ("Vdcn") can be outputted via the terminal concerned.

In this circuit, positive polarity voltage Vdcp (>0) and negative polarity voltage Vdcn (<0) are respectively outputted from output terminals "to1" and "to2".

In this connection, mark " • " attached to the winding of transformer T represents a start point of winding. For example, concerning secondary winding Ts, marks "•" are respectively attached to the connecting end of secondary winding Ts with diode D2 and the winding start end of the intermediate tap which is grounded.

Concerning the aforementioned forms (i) and (ii), it is sufficient to think that each form may be provided with only the secondary circuit from which the positive or negative polarity voltage is outputted. Therefore, further explanations will be omitted here.

The DC-AC conversion circuit 4 is arranged at the rear stage of the DC electric power source circuit 3 (as shown in FIG. 1). This DC-AC conversion circuit 4 is arranged for converting an output voltage of the DC electric power supply circuit 3 into an AC voltage (such as a rectangular wave form voltage) and supplying the AC voltage to the electric discharge lamp 6. A half bridge type or full bridge type circuit structure into which a semiconductor switch element is incorporated may be used for this circuit.

The starting circuit 5 is arranged for generating a high voltage starting signal (or starting pulse) for starting the electric discharge lamp 6 at the initial stage of lighting the electric discharge lamp 6. The high voltage signal concerned is superimposed upon AC voltage "Vout" outputted by DC-AC conversion circuit 4 and impressed upon the electric discharge lamp 6.

Figure 3:
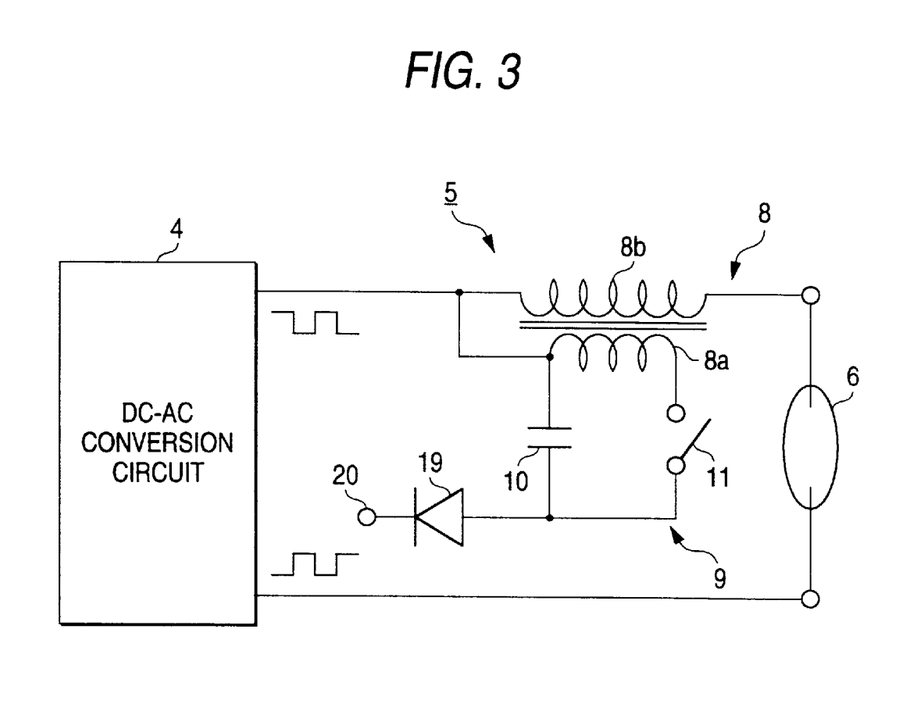
FIG. 3 is a circuit diagram showing an example of a structure of a starting circuit.

FIG. 3 is a view showing a basic structure of the starting circuit 5 arranged at the rear stage of the DC-AC conversion circuit 4. The starting circuit 5 is composed of a transformer 8 having a magnetic body (core), primary winding, secondary winding, and a primary circuit 9 arranged on the primary side of the transformer 8. As shown in the drawing, in the primary circuit, there are provided a primary winding 8a of the transformer 8, condenser 10 and switch element 11 (for example, a self-yielding type switch element or a switch element of a thyristor controlled by an external signal) which are formed into a series circuit. That is, this series circuit is connected in parallel to the primary winding 8a of the transformer 8. In this connection, concerning the secondary winding 8b of the transformer 8, one end of the secondary winding 8b is connected with the connecting point of the primary winding 8a with the condenser 10, and also one end of the secondary winding 8b is connected with one of the output terminals of the DC-AC conversion circuit 4, and the other end of the secondary winding 8b is connected with the electric discharge lamp 6.

In the case of starting the electric discharge lamp 6, when voltage across both terminals of the condenser 10 exceeds a threshold value in accordance with the accumulation of electrical discharge in the condenser 10 or when a trigger signal is given after that, the switch 11 closes so that an electric current flows in the primary winding 8a and a high voltage starting signal for starting the electric discharge lamp 6 can be impressed upon the electric discharge lamp 6 via the secondary winding 8b.

Concerning the supply voltage to the primary circuit 9, it can be supplied as a voltage sent from the DC electric power source circuit 3 (or as a voltage sent from the DC-AC conversion circuit 4).

Figure 4:
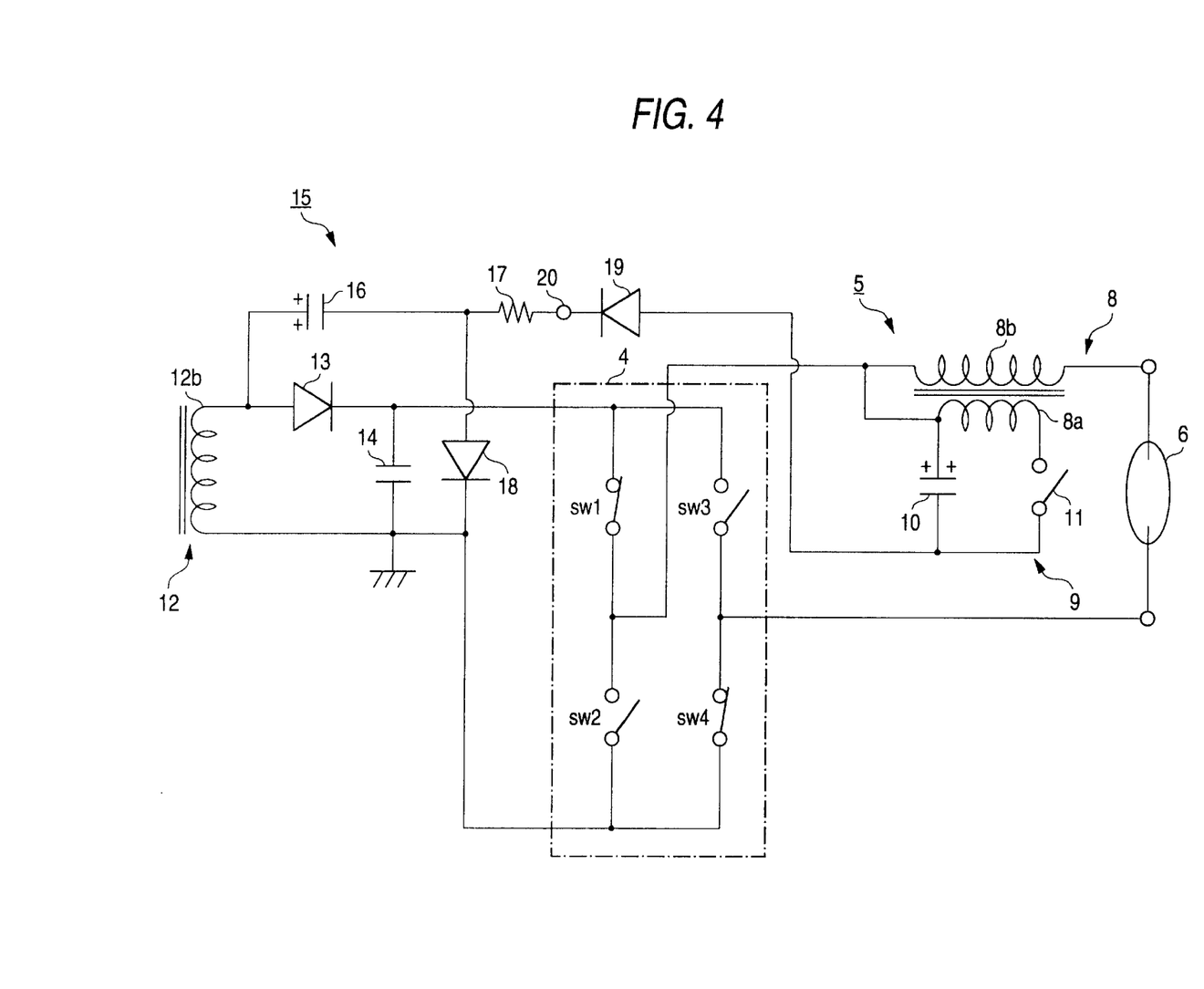
FIG. 4 is an example of a structure of a voltage supply circuit connected to a starting circuit.

FIG. 4 is a view showing an example of a suitable circuit structure. In the view, there is shown a portion of the circuit after the secondary side of the converter transformer composing the DC electric power source circuit (for example, a fly-back type DC-AC converter. In this connection, the polarity of the output voltage of the DC-electric power source circuit is positive.

One end of the secondary winding 12b of the converter transformer 12 is connected with the anode of the diode 13 used for rectification, and the cathode of diode 13 is connected with the condenser 14 used for smoothing, and the other end of the condenser is grounded. That is, the secondary voltage of the converter transformer 12 is rectified and smoothed and then sent out to the DC-AC conversion circuit 4.

The circuit section (voltage supply circuit) 15 relating to the supply voltage to the primary circuit 9 in the starting circuit 5 includes: a condenser 16 arranged in parallel with the diode 13; a resistor 17 connected in series to the condenser 16 concerned; and diodes 18, 19. That is, one end of the condenser 16 is connected with the anode of the diode 13, and the other end of the condenser 16 is connected with the resister 17 and the anode of the diode 18, and the cathode of the diode 18 is grounded. A terminal of the resistor 17, which is opposite to the connecting point with the condenser 16, is connected with the voltage supply terminal 20. This voltage supply terminal 20 is connected with the primary circuit 9 via the diode 19. (That is, the cathode of the diode 19 is connected with the voltage supply terminal 20, and the anode of the diode 19 is connected with the connecting point of the condenser 10 with the switch element 11 in the primary circuit 9.

In this embodiment, the DC-AC conversion circuit 4 is formed into a bridge type structure composed of the semiconductor switch elements sw1 to sw4. In FIG. 4, the semiconductor switch elements sw1 to sw4 are shown by marks representing switches, however, EET and other elements may be used. When a signal is given from a drive circuit not shown in the drawing, a pair of elements sw1, sw4 and a pair of elements sw2, sw3 reciprocally conduct switching control. The contacting point of the element sw1 with the element sw2 is connected with each winding of the transformer 8 of the starting circuit 5, and the contacting point of the element sw3 with the element sw4 is connected with one end of the electric discharge lamp 6.

As described above, in the case where the polarity of the secondary voltage of the converter transformer 12 is positive, if an open circuit voltage (referred to as "OCR" hereinafter) outputted from the DC electric power source circuit 3 before the electric discharge lamp is turned on is approximately 350 V for example, an output of the DC-AC conversion circuit 4 substantially becomes a voltage alternating between 0 V and 350 V, and this alternating voltage is supplied to the electric discharge lamp via the secondary winding of the transformer.

A self-yielding type element is used for the switch element 11 composing the primary circuit 9 in the starting circuit 5. Therefore, the switch element will be explained as a self-yielding type switch element hereinafter. If the yielding voltage of the self-yielding type switch is 600 V, then an OCR=350 V is not sufficient. Therefore, for example, when voltage of −350 V is supplied to the voltage supply terminal 20 in the circuit shown in FIG. 4, the condenser 10 in the primary circuit 9 can be electrically charged by the voltage, so that the maximum value is 700 V. Due to the foregoing, the switch element 11 can be closed.

In the anode of the diode 13 for rectification arranged on the secondary winding 12b side of the converter transformer 12 in FIG. 4, an alternating voltage is repeated between OCR=350 V and 0 V at the switching frequency of the converter by half wave rectifying action. When this voltage becomes 350 V, an electric current flows into the condenser 16 via the diode 18, so that the condenser can be electrically charged. When the voltage concerned (anode voltage) becomes a value not more than 0 V, an electrical potential of the connecting point of the condenser 16 with the diode 18 is temporarily decreased (In the drawing, the polarity of the condenser is represented by the mark "+".). At this time, the following electric current path is formed. The output terminal of the DC-AC conversion circuit 4→the condenser 10 in the starting circuit 5→the diode 19→the resister 17→the condenser 16 (further,→the secondary winding 12b of the transformer 12→the smoothing condenser 14→the input terminal of the DC-AC conversion circuit 4). Due to the foregoing, the electrical charge of the condenser 10 in the primary circuit 9 is moved into the condenser 16. Accordingly, when the above cycle is repeated several times (the charging time depends upon a ratio of electrostatic capacities of the condensers and a resistance value of the resistor 17), a voltage of −350 V can be finally obtained at the voltage supply terminal 20. As a result, negative voltage (−350 V), the maximum absolute value of which is 350 V, can be impressed upon one terminal of the condenser 10 in the primary circuit 9, and 350 V (=OCR) can be impressed upon the other terminal. Accordingly, the voltage across both terminals, the maximum value of which is 700 V (in the case where the switch element is open), can be obtained. Therefore, it is possible to obtain a voltage that is sufficient for electrically closing the switch element.

Where the polarity of the output voltage of the DC electric power source circuit is positive as described above, of course, the output voltage of the DC-AC conversion circuit becomes positive. Therefore, when this positive output voltage is supplied to one end of the condenser in the primary circuit of the starting circuit, and a negative voltage sent from the voltage supply terminal is supplied to the other end of the condenser, it is possible to accomplish the supply of a high voltage signal for starting an electric discharge lamp. The high voltage signal is generated only when a low voltage, which is low with respect to the ground electrical potential (ground), is supplied. That is, in the case where the voltage, the polarity of which is the same as that of the output voltage of the DC electric power source circuit, is supplied to the primary circuit like a conventional case, for example, in order to close a self-yielding type switch element, the yielding voltage of which is 600 V, it is necessary to supply a voltage higher than that (for example, it is necessary to supply a voltage of +700 V). Therefore, it is necessary to design the circuit to withstand high voltage. Further, when a feeder cable is shielded in order to prevent the occurrence of electromagnetic interference, it becomes necessary to give consideration to the design to withstand high voltage with respect to an electrical potential (shielding electrical potential) in the case of the shielding of a feeder cable. However, according to the present invention, with respect to the primary circuit, it is sufficient to supply a voltage lower than the ground electrical potential. Therefore, it is unnecessary to design a circuit to withstand high voltage. Accordingly, the safety of the lighting circuit can be enhanced and the manufacturing cost can be reduced.

In this connection, the resistor 17 shown in FIG. 4 is provided for restricting an electric current flowing in the diode 19 and also for adjusting a period of time required for the condenser 10 in the primary circuit 9 to be fully charged. Accordingly, for example, a resistor, which is connected in series to the diode 18 and the condenser 16, may be added for accomplishing the same object, or these resistors may not be included at all.

In the drawing, the connecting terminal of the secondary winding 8b with primary winding 8a of the transformer 8 is connected with one of the output terminals of the DC-AC conversion circuit 4. However, the present invention is not limited to the above specific arrangement. It is possible to adopt various circuit structures in which either component provided in a closed circuit (primary circuit), which includes the primary winding of the transformer, the condenser and the switch element, is connected with the output terminal of the DC-AC conversion circuit, and voltage is supplied to the primary circuit (in this case, voltage of the negative polarity is supplied) so that voltage across both terminals of the condenser can be a voltage level which is sufficient to close the switch element.

Figure 5:
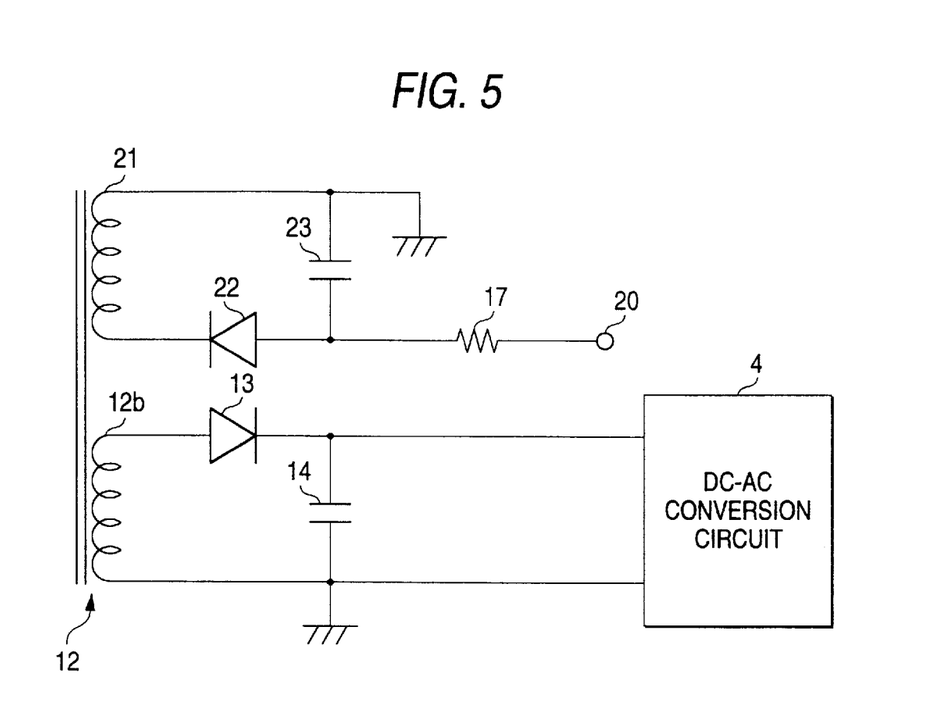
FIG. 5 is another example of a structure of a voltage supply circuit for connection to a starting circuit.

Further, as shown in FIG. 5, negative voltage may be generated by the circuit in which the secondary winding 21, different from the secondary winding 12b, is provided on the secondary side of the converter transformer 12. A diode 22 and a condenser 23 are further provided, and the thus generated negative voltage may be supplied to the primary circuit 9 of the starting circuit 5. In this example, one end of the secondary winding 21, which has been newly provided, is connected with the cathode of the diode 22 for rectification, and the anode of the diode is connected with the voltage supply terminal 20 via the resistor 17. Concerning the condenser 23 for smoothing, one end of the condenser 23 for smoothing is connected with the connecting point of the diode 22 with the resistor 17, and the other end is connected with the secondary winding 21 so that it can be grounded. The negative voltage, which is generated in the secondary winding 21 in this circuit and rectified and smoothed, is supplied from the voltage supply terminal 20 to the primary circuit 9 of the starting circuit 5 via the diode 19 (see FIG. 4). Concerning this secondary voltage, in order to make the absolute value of this secondary voltage to be the same as the secondary voltage in the above secondary winding, the turn ratios of both secondary windings should be the same. (For example, when the voltage of the secondary winding 12b is 350 V, the voltage of the secondary winding 21 can be −350 V.) Alternatively, in order to obtain negative voltage, the absolute value of which is higher than that, the setting of the turn ratio may be appropriately changed.

In the structure explained above, the supply voltage to the primary circuit is obtained from the DC electric power source circuit, however, it is possible to obtain the supply voltage to the primary circuit from the output of the DC-AC conversion circuit.

Figure 6:
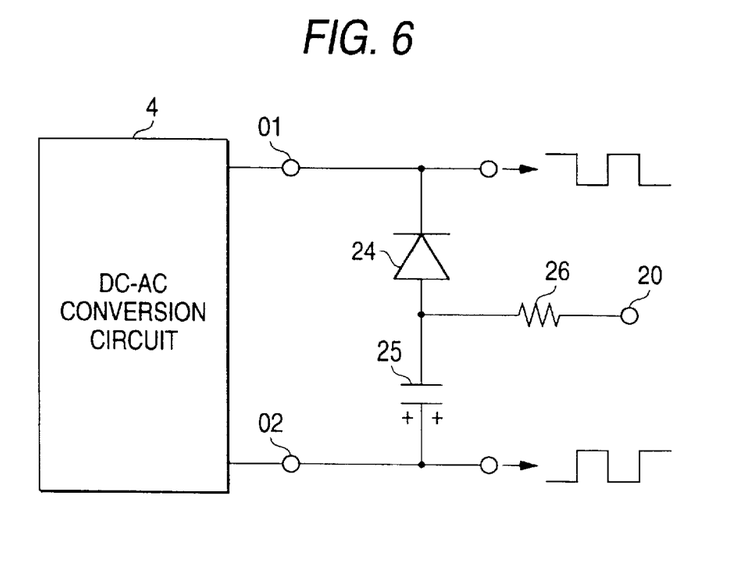
FIG. 6 is an example of a circuit structure by which a supply voltage is provided to a starting circuit in an output stage of a DC-AC conversion circuit.

FIG. 6 shows a circuit section arranged at the output stage of the DC-AC conversion circuit 4. In this circuit section, the cathode of the diode 24 is connected with one output terminal "O1" of the DC-AC conversion circuit 4, and the anode of the diode 24 is connected with the other output terminal "O2" of the DC-AC conversion circuit 4 via the condenser 25.

One end of the resister 26 is connected with the connecting point of the diode 24 with the condenser 25, and the other end of the resister 26 is connected with the voltage supply terminal 20. Therefore, this voltage supply terminal 20 is connected with the condenser 10 of the primary circuit 9 via the diode 19.

In this circuit, in the case of OCV=350 V, when the output voltage obtained from the output terminal "O2" of the DC-AC conversion circuit 4 is +350 V, current flows through diode 24 so that the condenser 25 can be charged. When the output voltage of the output terminal "O2" is not higher than 0 V, an electric current flows from the condenser 10 in the primary circuit 9 into the condenser 25 via the diode 19 and the resister 26, so that the electrical charge can be moved. Although a difference in time is caused according to a ratio of the electrostatic capacity of the condenser 25 to the electrostatic capacity of the condenser 10 and also according to the resistance value of the resister 26, the above cycle is repeated several times. Due to the foregoing, the voltage of −350 V can be obtained at the voltage supply terminal 20. As a result, voltage across both terminals of the condenser 10 can be 700 V at maximum, that is, a voltage that exceeds the self-yielding voltage of the switch element 11 can be obtained. In this connection, the function of the resister 26 is the same as that of the resister 17.

In the above examples, explanations are made for the case in which the self-yielding voltage of the switch element 11 is approximately 600 V. An example of the circuit structure in which the self-yielding voltage of the switch element 11 is higher than that, that is, an example of the circuit structure in which the self-yielding voltage of the switch element 11 is 800 V is shown in FIG. 7.

Figure 7:
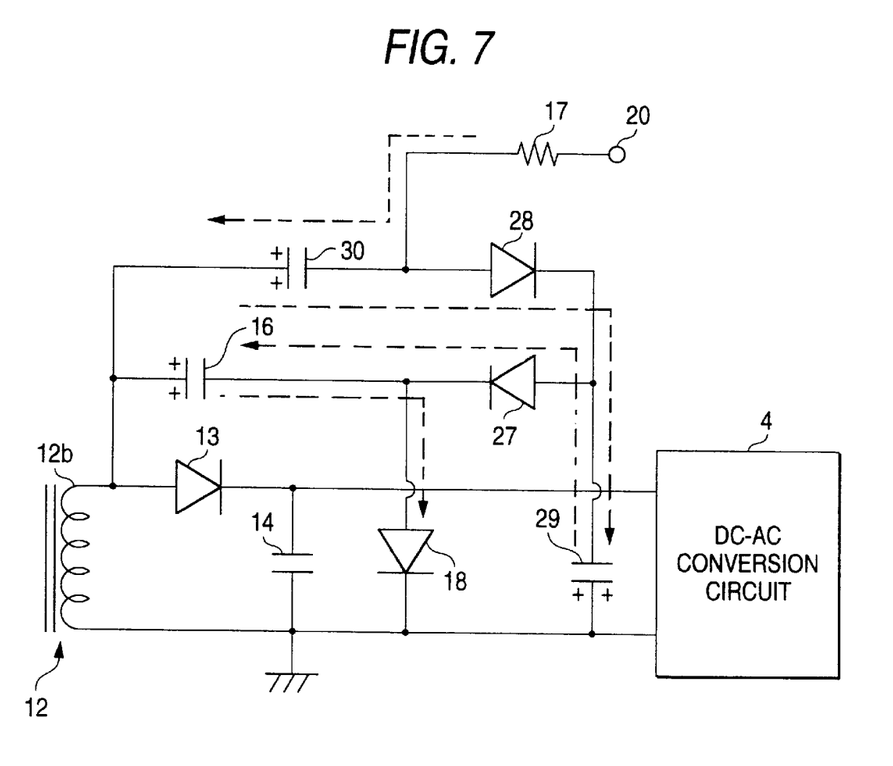
FIG. 7 is an example of a structure of a voltage supply circuit for a starting circuit in the case where the starting circuit includes a switch element having a high self-yielding voltage.

In FIG. 7, there is shown a circuit section (voltage supply circuit) arranged between the secondary circuit of the converter transformer 12 composing the DC electric power source circuit and the DC-AC conversion circuit. This circuit section is composed of a plurality of diodes 18, 27, 28 and condensers 16, 29, 30. The connecting relationship of the diode 13 used for rectification to the condenser 14 used for smoothing with respect to the secondary winding 12b of the converter transformer 12 is the same as that of the example shown in FIG. 4. That is, the anode of the diode 13 is connected with one end of the secondary winding 12b, and the cathode of the diode 13 is connected with ground via the condenser 14. One end of the condenser 16, which is arranged in parallel with the diode 13, is connected with the anode of the diode 13. The other end of the condenser 16 is connected with the anode of the diode 18, and the cathode of the diode 18 is grounded. The cathode of the diode 27 is connected with the connecting point of the condenser 16 with the diode 18. The anode of the diode 27 is grounded via the condenser 29 and connected with the cathode of the diode 28. The anode of the diode 28 is connected with the anode of the diode 13 via the condenser 30, and is also connected with the voltage supply terminal 20 via the resister 17. The negative voltage obtained from the voltage supply terminal 20 concerned is supplied to the primary circuit 9 of the starting circuit 5.

In this connection, in the drawing, a plurality of arrows expressed by broken lines show directions of the electrical currents flowing in the circuit when electrical charges are moved. For example, if the voltage obtained in the secondary winding before the electric discharge lamp is turned on is OCV=350 V, as an electric current path in which an electric current flows when the anode voltage of the diode 13 is 350 V, the electric current path is formed by the arrow heading up from the condenser 16 to the diode 18 and by the arrow heading up from the condenser 30 to the diode 28, and as an electric current path in which an electric current flows when the anode voltage of the diode 13 is 0 V, the electric current path is formed by the arrow heading up from the condenser 29 to the diode 27 and by the arrow heading up from resister 17 to the condenser 30.

As a result of the movement of the electrical charge described above, in this circuit, it is possible to obtain a supply voltage of "−350×2=−700 V" at maximum. Therefore, the voltage across both terminals of the condenser in the primary circuit can be increased to be three times as high as OCV. Therefore, it is sufficient to use a switch element 11, the self-yielding voltage of which is lower than "OCV×3" and exceeds "OCV×2". The reasons are described as follows. It is advantageous that the primary side voltage is high from the viewpoints of the size of the starting circuit and the manufacturing cost, and it is necessary to consider the fluctuations of self-yielding voltage of the switch elements that would be used.

Therefore, when the number of stages of the circuit in which the diodes and condensers are used is increased, it becomes possible to supply a negative voltage, the absolute value of which is higher. However, further explanations will be omitted here.

Concerning the lighting circuit of an electric discharge lamp in which the positive polarity output is used, the results are summarized as follows.

(A) When the output voltage of the DC electric power source circuit is positive with respect to the electrical potential of ground, according to the output of the DC electric power source circuit or DC-AC conversion circuit, the polarity of the supply voltage supplied to the circuit concerned for charging the condenser in the primary circuit of the starting circuit is made negative.

Next, explanations will be made concerning the circuit structure in which the polarity of the output voltage of the DC electric power source circuit is negative.

Figure 8:
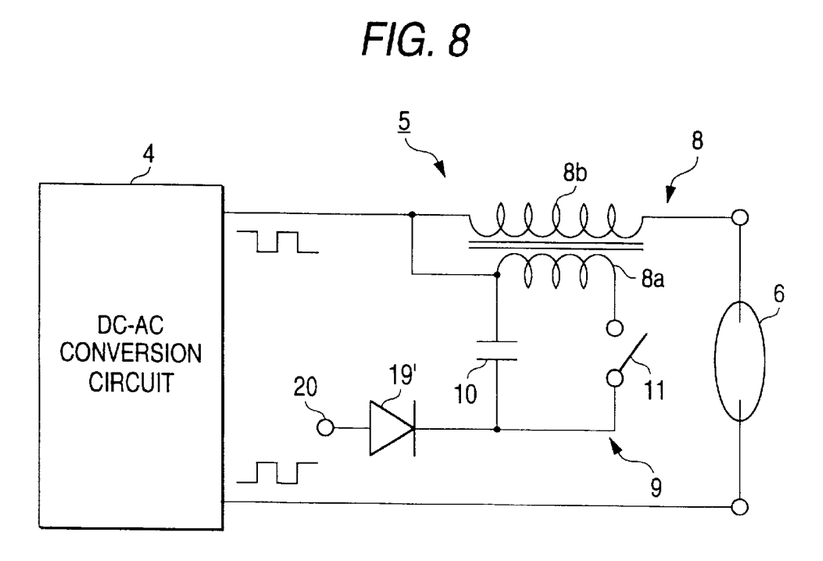
FIG. 8 is a circuit diagram showing another example of a structure of a starting circuit.

FIG. 8 is a view showing a basic structure of the starting circuit 5 arranged at the rear stage of the DC-AC conversion circuit 4. Different points of the circuit structure of FIG. 8 from those of the circuit structure of FIG. 3 are described as follows.

The polarity of the alternating voltage output from the DC-AC conversion circuit is a negative polarity.

The direction of the diode (19') with respect to the primary circuit is reversed from that described in the circuit of FIG. 3.

For example, in the case of "OCV=−350 V" before the electric discharge lamp 6 is turned on, the output voltage of the DC-AC conversion circuit 4 is an alternating voltage (rectangular waves or trapezoidal waves) repeating between 0 V and −350 V. Concerning the direction of the diode 19', the anode of the diode 19' is connected with the voltage supply terminal 20, and the cathode of the diode 19' is connected with the connecting point of the condenser 10 with the switch element 11.

On the assumption that the self-yielding voltage of the switch element 11 is 600 V, when the voltage supply terminal 20 is supplied with the voltage of +350 V, it is possible to obtain the maximum value 700 V (=2 ×OCV) of the voltage across both terminals of the condenser 10. That is, it is possible to obtain a sufficiently high voltage to electrically continue or close the switch element 11.

Figure 9:
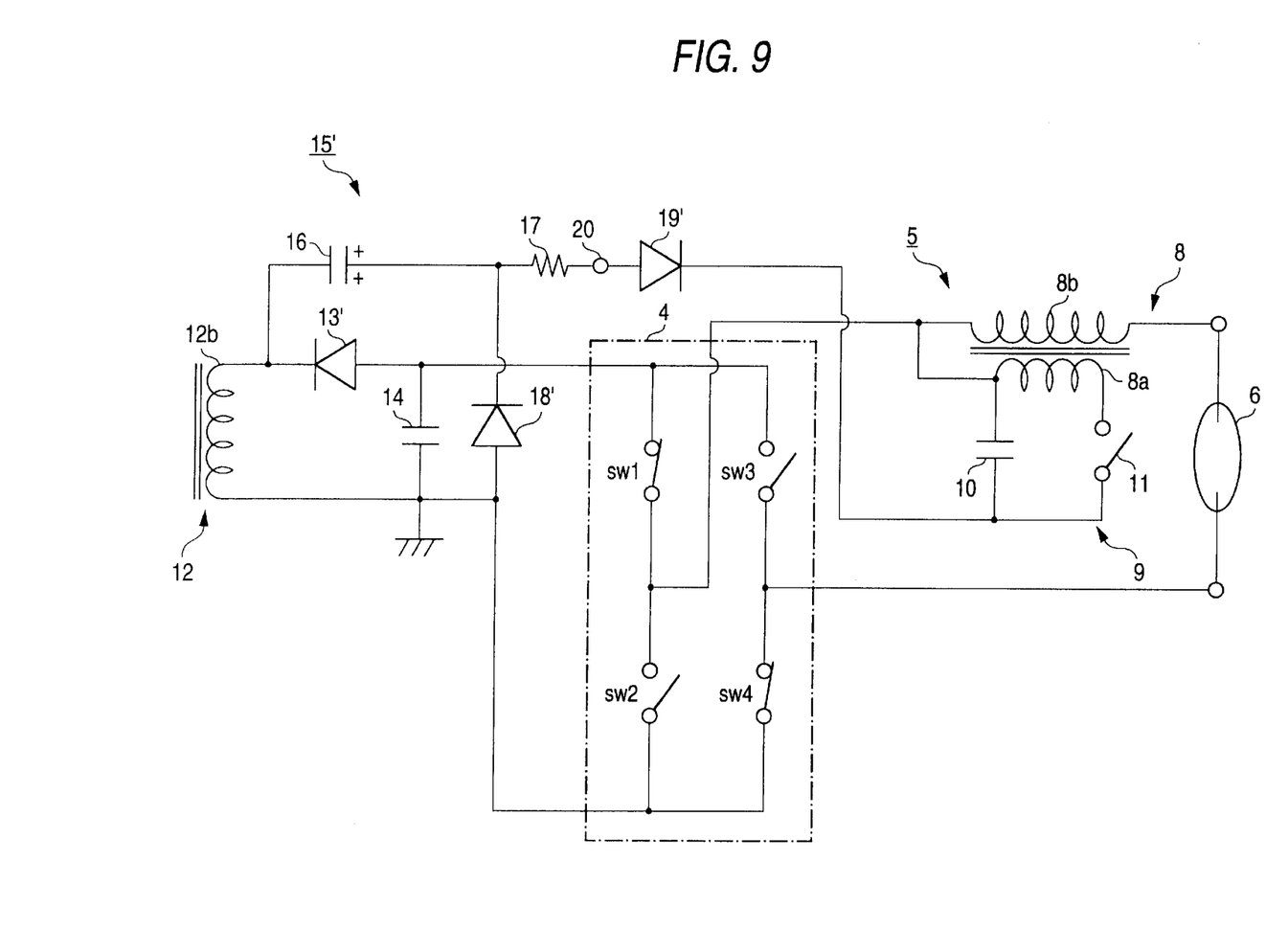
FIG. 9 is an example of a structure of a circuit for supplying voltage to a starting circuit according to a negative polarity voltage output from a DC electric power source circuit.

FIG. 9 is a view showing an example of the structure of the voltage supply circuit 15' for supplying voltage to the primary circuit 9 as voltage sent from the DC electric power source circuit. Different points from those shown in FIG. 4 are described as follows. Because the voltage polarity is reversed, the direction of the diode is reversed and the direction of the movement of electric charge relating to the condenser is exactly opposite. Concerning the diode 13' for rectification, the cathode of the diode 13' for rectification is connected with the secondary winding 12b of the converter transformer 12, and the anode is connected with the condenser 14. Concerning the diode 18', the cathode of the diode 18' is connected with the connecting point of the resister 17 with the condenser 16, and the anode is grounded.

Accordingly, when the cathode voltage of the diode 13' for rectification becomes −350 V, the condenser 16 is charged via the diode 18'. When the cathode voltage of the diode 13' for rectification becomes not lower than 0 V, an electric current flows via the resister 17 and the condenser 10 in the primary circuit 9, so that an electric charge moves into the condenser 16. When the above cycle is repeated several times, it is possible to obtain the voltage of+350 V at the voltage supply terminal 20. (When the voltage of −350 V given to the condenser 10 in the primary circuit 9 is added, it is possible to obtain the maximum voltage of 700 V.)

In this embodiment, it is possible to obtain a supply voltage to the primary circuit from the output of the DC-AC conversion circuit as shown in FIG. 6. Alternatively, it is also possible to obtain a supply voltage to the primary circuit by adding the secondary winding to the converter transformer 12 as shown in FIG. 5. Alternatively, it is also possible to adopt the structure shown in FIG. 7 in the case where the self-yielding voltage of the switch element is high.

However, it should be noted that the direction of the diode and the direction of the movement of the electrical charge are reversed.

Concerning the lighting circuit of an electric discharge lamp in which the negative polarity output is used, the results are summarized as follows.

(B) When the output voltage of the DC electric power source circuit is negative with respect to the electrical potential of ground, according to the output of the DC electric power source circuit or DC-AC conversion circuit, the polarity of the supply voltage supplied to the circuit concerned for charging the condenser in the primary circuit of the starting circuit is made positive.

Next, explanations will be made into an embodiment in which both polarity voltages of the positive and the negative polarity with respect to the electrical potential of ground are output from the DC electric power source circuit.

Figure 10:
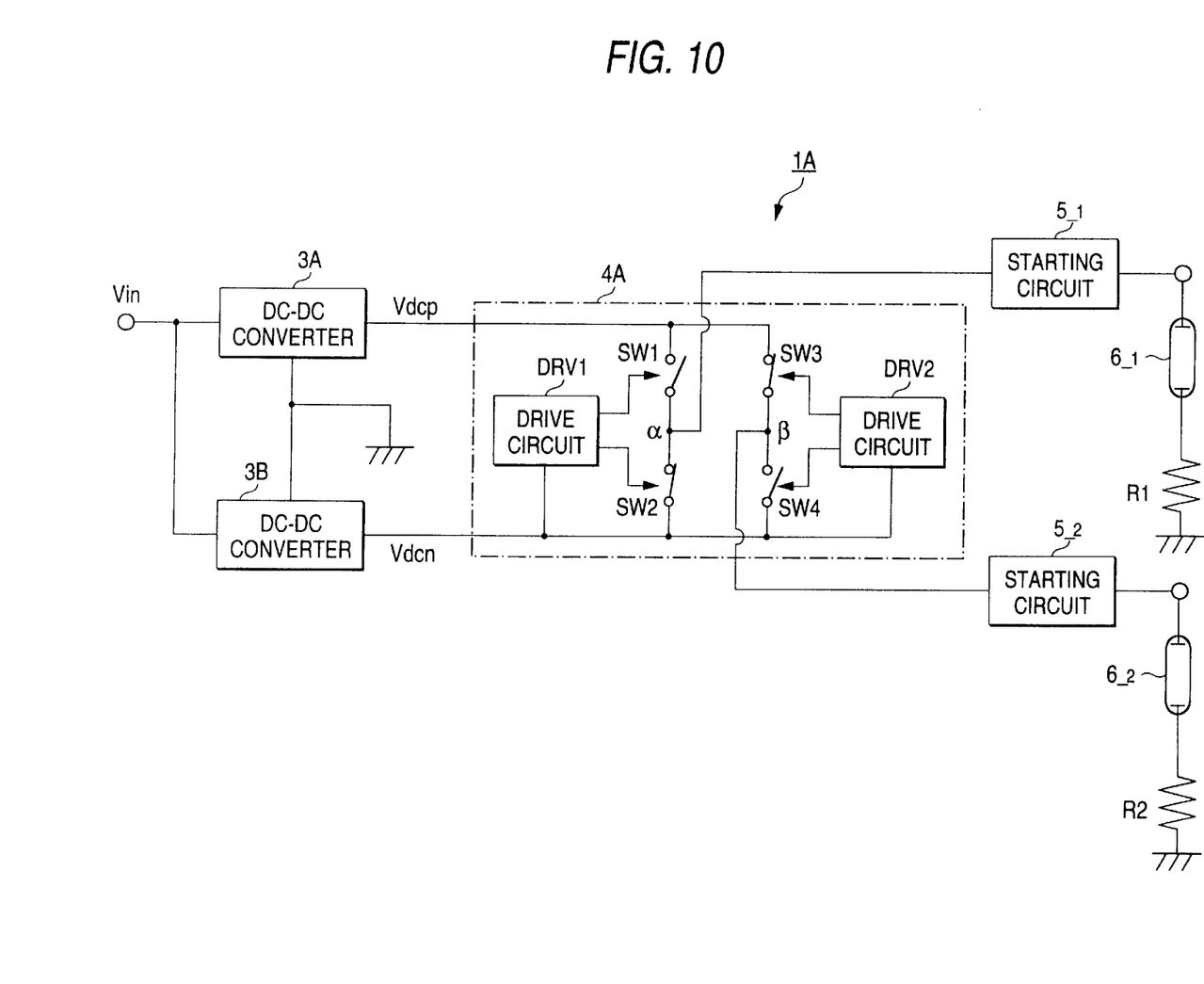
FIG. 10 is an example of a structure of a lighting circuit having a DC electric power source circuit for outputting both positive and negative voltages and for lighting two electric discharge lamps.
Figure 11:
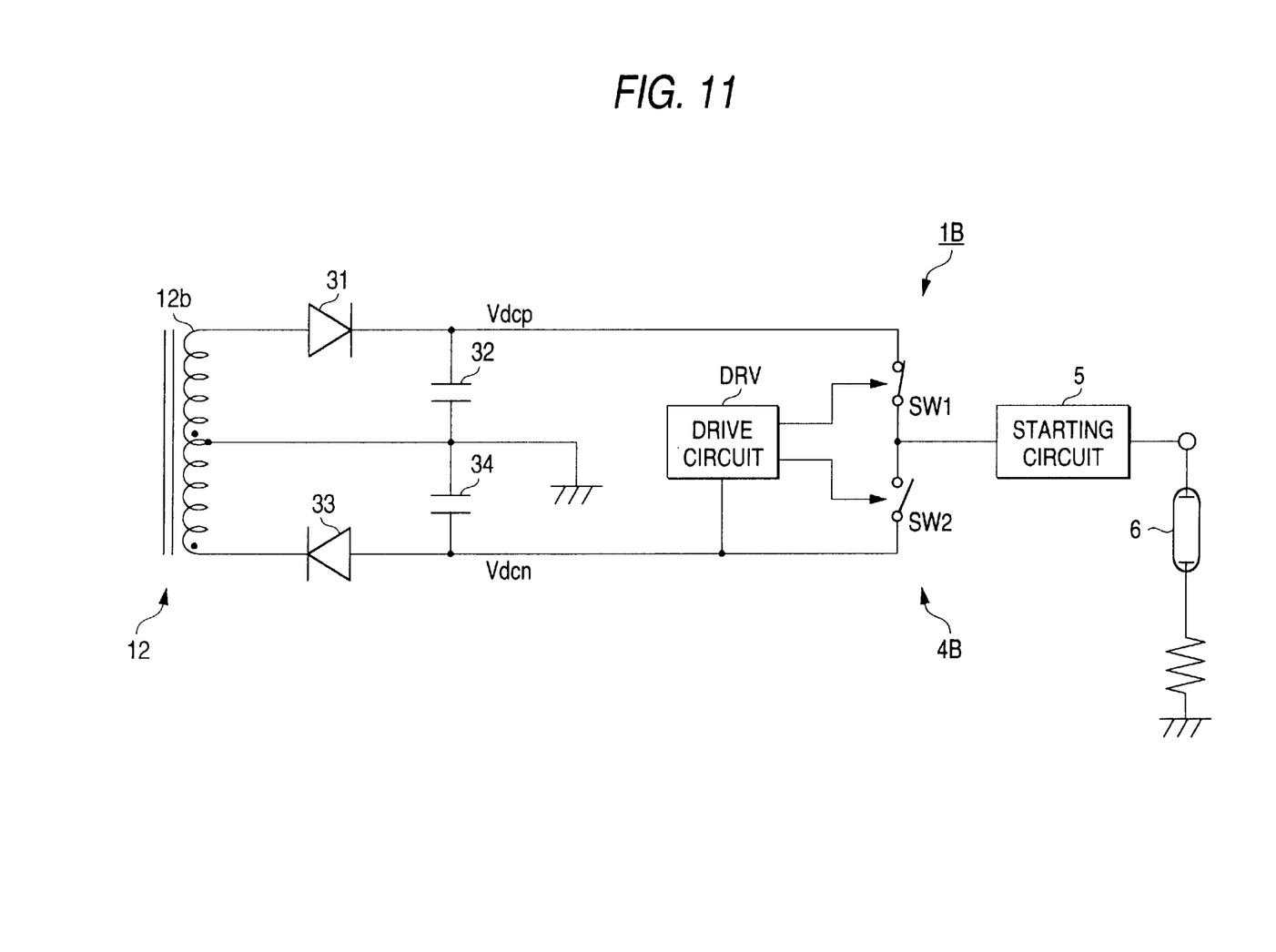
FIG. 11 is an example of a structure of a lighting circuit having a DC electric power source circuit for outputting both positive and negative voltages and for lighting one electric discharge lamp.

FIGS. 10 and 11 are views showing a primary portion of an example of the structure of the lighting circuit that generates both polarity voltages.

FIG. 10 shows a circuit structure by which two electric discharge lamps 6_1, 6_2 can be turned on by the common lighting circuit 1A. In this example, the DC electric power source circuit 3 is composed of a DC-DC converter 3A for outputting a positive polarity voltage and a DC-DC converter 3B for outputting a negative polarity voltage (The circuit example is shown in FIG. 2.). At the rear stage of these converters, there is provided a DC-AC conversion circuit 4A having a full bridge type circuit structure including four switch elements sw1, sw2, sw3, sw4 (semiconductor switches may be used for these switch elements, however, for ease of reference these switch elements are represented by the marks of mere switches). Concerning the switch elements sw1, sw2, which are connected with each other in series so that they are formed into a first pair, one end of the switch element sw1 is connected with the output terminal of the DC-DC converter 3A, and the other end of the switch element sw1 is connected with the output terminal of the DC-DC converter 3B via the switch element sw2. The connecting point of both switch elements is connected with the first electric discharge lamp 6_1 via the starting circuit 5_1 (the inducing load of the starting circuit 5_1). Concerning the switch elements sw3, sw4, which are connected with each other in series so that they are formed into a second pair, one end of the switch element sw3 is connected with the output terminal of the DC-DC converter 3A, and the other end of the switch element sw3 is connected with the output terminal of the DC-DC converter 3B via the switch element sw4. The connecting point of both switch elements is connected with the second electric discharge lamp 6_2 via the starting circuit 5_2 (the inducing load of the starting circuit 5_2). The terminals of the electric discharge lamps 6_1, 6_2, which are not connected with the connecting points α and β are directly grounded or grounded via the resisters R1, R2 used for electric current detection.

In both drive circuits DRV1, DRV2, there are provided IC (integrated circuits) for the use of a half bridge driver. One drive circuit DRV1 turns on and off the switch elements sw1, sw2, and the other drive circuit DRV2 turns on and off the switch elements sw3, sw4. When the switch elements are regulated so that the switch element sw1 can be turned on and the switch element sw2 can be turned off by the drive circuit DRV1 at a point of time, the switch elements are regulated so that the switch element sw3 can be turned off and the switch element sw4 can be turned on by the drive circuit DRV2 at this time. When the switch elements are regulated so that the switch element sw1 can be turned off and the switch element sw2 can be turned on by the drive circuit DRV1 at another point of time, the switch elements are regulated so that the switch element sw3 can be turned on and the switch element sw4 can be turned off by the drive circuit DRV2 at this time. As described above, the switch elements sw1 and sw4 are put into the same state, and the switch elements sw2 and sw3 are put into the same state, and these switch elements are reciprocally alternated.

Accordingly, when the two pairs of switch elements are turned on and off, for example, while the voltage (positive voltage) of the positive polarity is being supplied to the first electric discharge lamp 6_1, the voltage (negative voltage) of the negative polarity is supplied to the second electric discharge lamp 6_2. (On the contrary, while the voltage of the negative polarity is being supplied to the first electric discharge lamp 6_1, the voltage of the positive polarity is supplied to the second electric discharge lamp 6_2.)

FIG. 11 shows a primary portion of the circuit structure after the secondary winding of the converter transformer with respect to the lighting circuit 1B of one electric discharge lamp. As shown in the drawing, at the end of the secondary winding 12b of the converter transformer 12, there is provided a diode 31 for rectification. When the voltage, which is subjected to half-wave rectification by the action of the diode concerned, is smoothed by the condenser 32 arranged between the cathode of the diode 31 and the intermediate tap of the secondary winding, the voltage Vdcp of the positive polarity can be obtained. At the start of the secondary winding 12b of the converter transformer 12, there is provided a diode 33 for rectification. When the voltage, which is subjected to half-wave rectification by the action of the diode concerned, is smoothed by the condenser 34 arranged between the anode of the diode 33 and the intermediate tap of the secondary winding 12b, the voltage Vdcn of the negative polarity can be obtained.

Concerning the DC-AC conversion circuit 4B arranged at the rear stage, in order to change over their output voltages Vdcp, Vdcn, there are provided a pair of semiconductor switch elements SW1, SW2 (although field effect transistors may be used for these elements, for ease of reference these elements are represented by marks of mere switches). Alternating voltage generated when each element is alternated by the drive circuit DRV is supplied to the electric discharge lamp 6 via the starting circuit 5 (the inducing load of the starting circuit 5).

Concerning the switching elements SW1 and SW2, the switching element SW1 is connected with the cathode of the diode 31 and also connected with the anode of the diode 33 via the switching element SW2. A well known IC is used as a half bridge driver for the drive circuit DRV which reciprocally conducts switching control on those switching elements. The half bridge conducts an alternating motion and DC voltage is converted into AC voltage so that the element SW2 can be turned off when the element SW1 is turned on and on the contrary the element SW2 can be turned on when the element SW1 is turned off by the signal supplied from the drive circuit DRV to the control element of each switch. In this connection, as shown in the drawing, the drive circuit DRV is operated according to the negative polarity voltage of the voltage Vdcn. Therefore, it is necessary to provide an electric power source voltage for the drive circuit DRV. In the same way, consideration must be given to the control signal input from the control section not shown into the drive circuit DRV.

In the circuits shown in FIGS. 10 and 11, the output of the DC electric power circuit has both polarities, the positive and the negative polarity, and both polarities are changed over by the switch element so that the output is supplied to the electric discharge lamp. Therefore, it is necessary to give consideration to the polarity of the output voltage of the DC-AC conversion circuit when the electric discharge lamp is to be turned on by impressing a high voltage starting signal upon the electric discharge lamp.

Concerning the polarity of the voltage supplied to the electric discharge lamp from the DC-AC conversion circuit before the start of the electric discharge lamp, it is preferable to control in such a manner that the state of the switch element of the DC-AC conversion circuit is fixed so that the polarity of the supplied voltage can be regulated to one of the positive and the negative polarity (according to the level regulation relating to the control signal sent to the drive circuit) so that the switch element can conduct an alternating motion after the electric discharge lamp has been turned on. The reason is described as follows. Before the electric discharge lamp is turned on, the output voltage of the DC electric power source circuit is increased to a necessary level (OCV) and the polarity of the DC-AC conversion circuit is fixed and the high voltage starting pulse is impressed upon the electric discharge lamp. Due to the foregoing, the electric discharge lamp can be positively turned on, that is, the electric discharge lamp can be stably turned on when the switch element conducts an alternating motion after that.

It is preferable that the polarity of the supply voltage to the starting circuit is regulated as follows.

In the case where the polarity of the output voltage of the DC-AC conversion circuit is regulated to be the positive polarity at the starting point when the electric discharge lamp is illuminated, the polarity of the supply voltage supplied to the primary circuit of the starting circuit from the DC electric power source circuit or the DC-AC conversion circuit is made to be the negative polarity.

In the case where the polarity of the output voltage of the DC-AC conversion circuit is regulated to be the negative polarity at the starting point when the electric discharge lamp is illuminated, the polarity of the supply voltage supplied to the primary circuit of the starting circuit from the DC electric power source circuit or the DC-AC conversion circuit is made to be the positive polarity.

For example, in the circuit structures shown in FIGS. 10 and 11, if the voltage polarity is regulated to be the positive polarity when the electric discharge lamp is illuminated, it is sufficient that the polarity of the supply voltage to the primary circuit of the starting circuit for the electric discharge lamp is made to be the negative polarity. In order to accomplish the above object, it is clear that the circuit structures shown in FIGS. 3 to 7 can be used as they are. (In the same manner, in the circuit structures shown in FIGS. 10 and 11, if the voltage polarity is regulated to be the negative polarity when the electric discharge lamp is illuminated, it is sufficient that the polarity of the supply voltage to the primary circuit of the starting circuit for the electric discharge lamp is made to be the positive polarity. In order to accomplish the above object, it is sufficient that the circuit structures shown in FIGS. 8 and 9 can be used and that the circuit structures shown in FIGS. 5 to 7, in which the direction of the diode is reversed, can be used.

In this connection, concerning the high voltage starting signal to be generated, the high voltage starting signal is generated by the starting circuit as a resonance wave form which is substantially formed into a sine wave. It is preferable to regulate that the voltage polarity of the signal concerned in the first half wave period is the reverse of the polarity of the output voltage of the DC electric power source circuit or the DC-AC conversion circuit. The reason will be described below.

Figure 12:
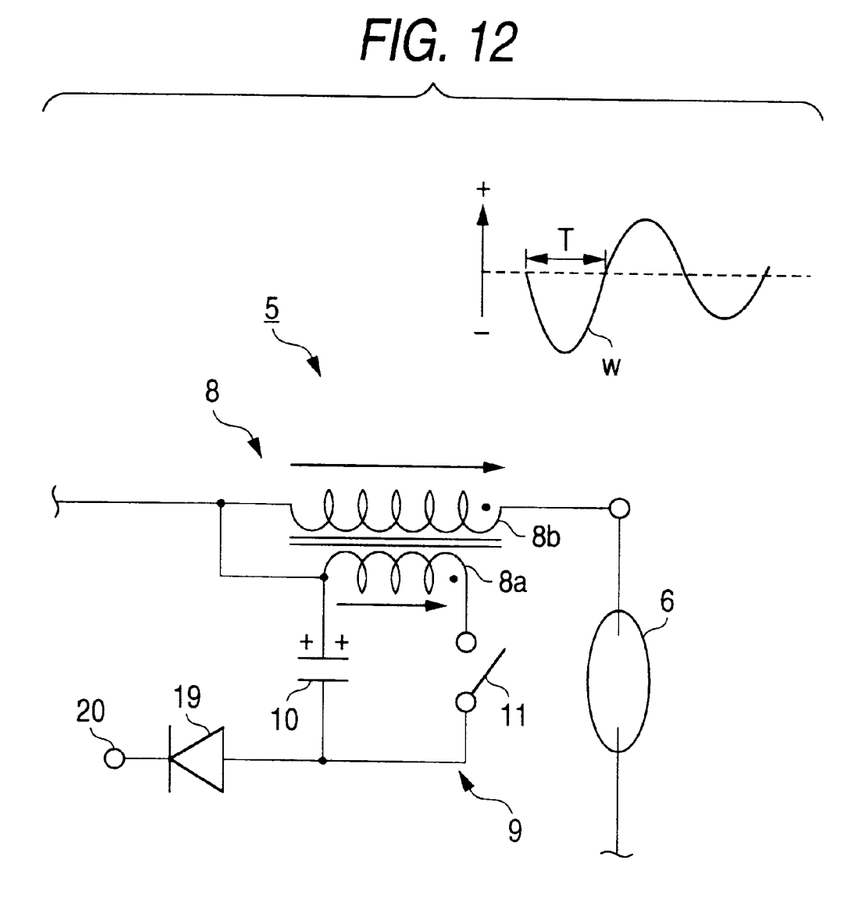
FIG. 12 is a schematic diagram for explaining polarity regulation relating to a high voltage signal for a starting circuit.

FIG. 12 is a view showing a portion of the starting circuit shown in FIG. 3. The polarity of the output voltage of the DC electric power source circuit 3 is made to be the positive polarity. In this connection, concerning the directions of the electric currents flowing in the primary winding 8a and the secondary winding 8b of the transformer 8, the direction indicated by the arrow in the drawing, which is directed to the right, is defined as a positive direction, that is, the direction approaching mark "•" showing a start point of the winding is defined as a positive direction. Concerning each winding of the transformer 8, the switch element 11 is connected with the starting side terminal of the primary winding 8a, and the electric discharge lamp 6 is connected with the starting side terminal of the secondary winding 8b.

As described above, when the voltage polarity is regulated to be the positive polarity at a point of time when the electric discharge lamp 6 is illuminated, the condenser 10 in the primary circuit 9 of the transformer 8 is charged with the polarity represented by mark "+". When the voltage across both terminals of the condenser concerned has reached a predetermined threshold value, the switch element 11 is turned on. The direction of the resonance current (primary current) flowing at this time becomes positive at the first half period. On the assumption that the electric discharge lamp is not connected so that no load is given at this time, in the high voltage pulse caused by resonance, the voltage polarity in the first half period T becomes negative as shown by the wave form w in the drawing. (Voltages of the starting ends of the primary winding 8a and the secondary winding 8b are negative.) On the other hand, concerning the electric current, the electric discharge lamp has impedance. Therefore, on the assumption that an electric current flows in the secondary winding 8b, the direction of the resonance current flowing in the secondary winding concerned is negative in the first half period.

In the case of turning on the electric discharge lamp, the electric discharge lamp is in a state of no load at the beginning stage, and then the electric discharge lamp is electrically charged by the action of high voltage pulses, so that the electric discharge lamp has impedance. Therefore, the secondary electric current of the transformer 8 does not flow in the beginning, however, when the electric discharge lamp 6 is electrically charged, the secondary electric current of the transformer 8 starts flowing. That is, when the switch element 11 in the primary circuit 9 is turned on, an electric current starts flowing in the positive direction in the primary winding 8a, and negative voltage is generated at the terminal of the secondary winding 8b on the electric discharge lamp side (the terminal on the starting end side), so that the electric discharge lamp is electrically charged (the electric discharge lamp is charged). Due to the foregoing, an electric current of the negative direction, which is combined with the primary winding 8a, starts flowing in the secondary winding 8b.

Since the primary electric current is attenuated in a very short period of time, the secondary electric current is attenuated in the same manner. However, the direction of an electric current (offset electric current) remaining after the completion of resonance is positive. This direction of the electric current has an important meaning in the lighting performance of the electric discharge lamp. Therefore, the aforementioned regulation of the voltage polarity is a necessary condition to make the direction (the positive direction in this case) of the offset electric current agree with the polarity (positive polarity) of the output voltage of the DC-AC conversion circuit. Therefore, it is regulated that the voltage polarity of the high voltage pulse in the first half wave period is regulated to be the reverse polarity (the negative polarity in this example) to the polarity (the positive polarity in this example) of the output voltage of the DC electric power source circuit. If both are regulated to be same polarity, since the direction of the offset electric current becomes negative, there is a possibility that the lighting performance of the electric discharge lamp will be impaired.

In the above explanations, it is assumed that the polarity of the output voltage of the DC electric power source circuit is positive. However, when the polarity of the output voltage of the DC electric power source circuit is negative, the definition of the arrow indicating the direction of the electric current may be reversed. Therefore, the polarity of the resonance voltage relating to the high voltage pulse in the first half period may be made positive. (The wave form "w" shown in FIG. 12 may be inverted). In order to invert the wave form "w" shown in FIG. 12, for example, a relation of the starting end of winding of the transformer 8 with the finishing end of winding may be changed to a reverse phase relation (The electric discharge lamp 6 is connected with the terminal on the finishing end side of the secondary winding 8b.). Alternatively, the positional relation of the condenser 10 with the switch element 11 may be replaced with each other in FIG. 12.

It is preferable that the aforementioned polarity regulation is applied to a case in which the polarity of the DC-AC conversion circuit is temporarily fixed before the electric discharge lamp is turned on in the circuit having the outputs of both the positive and negative polarities shown in FIGS. 10 and 11. That is, when the polarity of the output voltage of the DC-AC conversion circuit is regulated to be the positive polarity (or the negative polarity), the voltage polarity of the high voltage pulse in the first half wave period is regulated to be the negative polarity (or the positive polarity).

As can be seen in the above explanations, according to the present invention, when the supply voltage, the polarity of which is the reverse with respect to the polarity of the output voltage of the DC electric power source circuit. is supplied to the primary circuit of the starting circuit, the withstanding voltage of the voltage supply line to the circuit concerned can be reduced. Therefore, the design of the withstanding voltage can be easily carried out, and safety can be enhanced and the manufacturing cost can be reduced (It becomes unnecessary to provide more expensive parts to withstand high voltage). Further, even when the DC electric power source circuit, which outputs both polarity voltages of the positive and the negative polarity, is used, it is possible to reduce the supply voltage (the electric potential with respect to the electric potential of ground) to the primary circuit of the starting circuit. In addition, the voltage polarity of the high voltage starting signal, which is generated in the starting circuit, in the first half wave period is regulated to be the reverse polarity to the polarity of the output voltage of the DC electric power source circuit or the DC-AC conversion circuit. Due to the foregoing, the lighting performance of the electric discharge lamp can be enhanced, and the electric discharge lamp can be prevented from going out.

What is claimed is:

1. A lighting circuit for an electric discharge lamp comprising:
    a DC electric power source circuit for outputting a DC voltage;
    a DC-AC conversion circuit for converting an output voltage of the DC electric power source circuit into an AC voltage to supply the AC voltage to an electric discharge lamp; and
    a starting circuit for generating a high voltage starting signal to start the electric discharge lamp, wherein
        (a) the starting circuit includes a transformer having a magnetic body, a primary winding and a secondary winding, and a primary circuit provided on the primary side of the transformer,
        (b) the primary circuit includes the primary winding and a series circuit that includes a condenser and a switch element, and the series circuit is connected in parallel with the primary winding,
        (c) when or after the voltage across both terminals of the condenser exceeds a threshold value in accordance with the accumulation of electrical charge in the condenser, the switch element is closed so that the high voltage starting signal is impressed upon the electrical discharge lamp from the primary winding via the secondary winding, and
        (d) one side of the condenser is connected to the primary winding, a voltage is supplied to the other side of the condenser to charge the condenser according to the output from the DC electric power source circuit or DC-AC conversion circuit, and a polarity of the voltage supplied to charge the condenser is opposite to the polarity of the output voltage of the DC electric power source circuit.

2. A lighting circuit for an electric discharge lamp according to claim 1, wherein the DC electric power source circuit outputs both positive and negative polarity voltages with respect to the ground electric potential, and wherein when the polarity of the output voltage of the DC-AC conversion circuit is a positive polarity at a starting point when the electric discharge lamp is illuminated, the polarity of the supply voltage supplied from the DC electric power source circuit or DC-AC conversion circuit to the primary circuit of the starting circuit is made to be a negative polarity, and wherein when the polarity of the output voltage of the DC-AC conversion circuit is a negative polarity at the starting point, the polarity of the supply voltage supplied from the DC electric power source circuit or DC-AC conversion circuit to the primary circuit of the starting circuit is made to be a positive polarity.

3. A lighting circuit for an electric discharge lamp according to claim 1, wherein the high voltage starting signal is generated as a resonance wave form the shape of which is substantially a sine wave, and the voltage polarity of the signal in a first half wave period is a reverse polarity to the polarity of the output voltage of the DC electric power source circuit or DC-AC conversion circuit.

4. A lighting circuit for an electric discharge lamp according to claim 2, wherein the high voltage starting signal is generated as a resonance wave form the shape of which is substantially a sine wave, and the voltage polarity of the signal in a first half wave period is a reverse polarity to the polarity of the output voltage of the DC electric power source circuit or DC-AC conversion circuit.

5. A method for illuminating an electric discharge lamp comprising:
    generating a DC power voltage;
    converting the DC voltage into an AC voltage using a converter; and
    generating a high voltage starting signal with a starting circuit comprising a transformer having a magnetic body, a primary winding, a secondary winding, and a condenser coupled to the primary winding at one end and to the converter at the other end to power the electric discharge lamp, wherein when the DC power voltage is positive the polarity of a supply voltage to the starting circuit is negative, and wherein when the DC power voltage is negative the polarity of a supply voltage to the starting circuit is positive.

* * * * *